United States Patent
Ashworth et al.

(10) Patent No.: US 11,218,237 B2
(45) Date of Patent: Jan. 4, 2022

(54) INTERMEDIATE FREQUENCY (IF) FILTERING FOR ENHANCED CROSSOVER ATTENUATION IN A REPEATER

(71) Applicant: WILSON ELECTRONICS, LLC, St. George, UT (US)

(72) Inventors: Christopher Ken Ashworth, Toquerville, UT (US); Dale Robert Anderson, Colleyville, TX (US)

(73) Assignee: Wilson Electronics, LLC, St. George, UT (US)

( * ) Notice: Subject to any disclaimer, the term of this patent is extended or adjusted under 35 U.S.C. 154(b) by 0 days.

(21) Appl. No.: 16/583,801

(22) Filed: Sep. 26, 2019

(65) Prior Publication Data

US 2020/0106541 A1    Apr. 2, 2020

Related U.S. Application Data

(60) Provisional application No. 62/737,761, filed on Sep. 27, 2018.

(51) Int. Cl.
*H04J 1/10* (2006.01)
*H04B 7/155* (2006.01)
(Continued)

(52) U.S. Cl.
CPC .............. *H04J 1/10* (2013.01); *H04B 7/1555* (2013.01); *H04L 5/1461* (2013.01); *H04L 25/03159* (2013.01)

(58) Field of Classification Search
CPC .... H04B 7/15542; H04B 1/40; H04B 17/401; H04B 7/15507; H01Q 1/22
See application file for complete search history.

(56) References Cited

U.S. PATENT DOCUMENTS 4,776,032 A   10/1988   Odate et al.
5,303,395 A    4/1994   Dayani
(Continued)

FOREIGN PATENT DOCUMENTS

CN    1985449 A    6/2007
CN    101534133 A   9/2009
(Continued)

OTHER PUBLICATIONS

3GPP2 C.S0011-B; "Recommended Minimum Performance Standards for cdma2000® Spread Spectrum Mobile Stations;" TIA-98-E; (Dec. 13, 2002); Release B, Version 1, Revision E.
(Continued)

*Primary Examiner* — Chandrahas B Patel
(74) *Attorney, Agent, or Firm* — Thorpe North & Western, LLP.

(57) ABSTRACT

Technology for a repeater is disclosed. The repeater can include a signal path configured to carry a signal having a selected radio frequency (RF) bandwidth on an RF carrier at a selected frequency. The signal path can include an intermediate frequency (IF) filter block operable for down-conversion of the RF carrier to an IF carrier to enable the selected RF bandwidth of the signal to be bandpass filtered at an IF filter bandwidth having an IF passband frequency range and the IF passband frequency range of the IF filter bandwidth is greater than the selected RF bandwidth. The down-conversion to the IF carrier can provide increased crossover attenuation or midband isolation of the RF carrier for the repeater.

28 Claims, 11 Drawing Sheets

(51) Int. Cl.
*H04L 5/14* (2006.01)
*H04L 25/03* (2006.01)

(56) References Cited

U.S. PATENT DOCUMENTS

| | | | |
|---|---|---|---|
| 5,737,687 A | 4/1998 | Martin et al. | |
| 5,745,479 A | 4/1998 | Burns et al. | |
| 5,777,530 A | 7/1998 | Nakatuka | |
| 5,835,848 A | 11/1998 | Bi et al. | |
| 6,005,884 A | 12/1999 | Cook et al. | |
| 6,292,652 B1* | 9/2001 | Kim | H04B 7/15542 455/20 |
| 6,363,262 B1 | 3/2002 | McNicol | |
| 6,711,388 B1 | 3/2004 | Neitiniemi | |
| 6,889,033 B2 | 5/2005 | Bongfeldt | |
| 6,990,313 B1 | 1/2006 | Yarkosky | |
| 7,035,587 B1 | 4/2006 | Yarkosky | |
| 7,149,488 B2 | 12/2006 | Khorram | |
| 7,221,967 B2 | 5/2007 | Van Buren et al. | |
| 7,610,029 B2 | 10/2009 | Li | |
| 7,907,891 B2* | 3/2011 | Proctor, Jr. | H04B 7/15571 455/7 |
| 7,974,573 B2 | 7/2011 | Dean | |
| 7,986,647 B2* | 7/2011 | Ghadaksaz | H04B 7/15542 370/293 |
| 8,068,783 B2 | 11/2011 | Braithwaite et al. | |
| 8,150,309 B2 | 4/2012 | Braithwaite | |
| 8,792,536 B2* | 7/2014 | Kwak | H04B 7/155 375/211 |
| 9,054,664 B1 | 6/2015 | Ashworth et al. | |
| 9,054,777 B2 | 6/2015 | Wood et al. | |
| 9,065,415 B1 | 6/2015 | Buren et al. | |
| 9,402,106 B1* | 7/2016 | Harris | H04N 7/17309 |
| 2002/0044594 A1 | 4/2002 | Bongfeldt | |
| 2003/0016761 A1 | 1/2003 | Min | |
| 2003/0123401 A1 | 7/2003 | Dean | |
| 2004/0110469 A1 | 6/2004 | Judd et al. | |
| 2004/0137854 A1 | 7/2004 | Ge | |
| 2004/0146013 A1 | 7/2004 | Song et al. | |
| 2004/0166802 A1 | 8/2004 | McKay, Sr. et al. | |
| 2004/0219876 A1 | 11/2004 | Baker et al. | |
| 2004/0235417 A1 | 11/2004 | Dean | |
| 2005/0118949 A1 | 6/2005 | Allen et al. | |
| 2006/0019604 A1 | 1/2006 | Hasarchi | |
| 2006/0084379 A1 | 4/2006 | O'Neill | |
| 2006/0164160 A1 | 7/2006 | Muhammad et al. | |
| 2007/0071128 A1 | 3/2007 | Meir et al. | |
| 2007/0188235 A1 | 8/2007 | Dean | |
| 2008/0081555 A1 | 4/2008 | Kong et al. | |
| 2008/0096483 A1 | 4/2008 | Van Buren et al. | |
| 2008/0113617 A1 | 5/2008 | Braithwaite | |
| 2008/0278237 A1 | 11/2008 | Blin | |
| 2008/0293360 A1 | 11/2008 | Maslennikov et al. | |
| 2009/0011736 A1 | 1/2009 | Malasani | |
| 2009/0075640 A1 | 3/2009 | Poppe | |
| 2009/0196215 A1 | 8/2009 | Sabat et al. | |
| 2010/0080154 A1 | 4/2010 | Noh et al. | |
| 2010/0311480 A1 | 12/2010 | Raines et al. | |
| 2011/0151771 A1 | 6/2011 | Son | |
| 2011/0151775 A1 | 6/2011 | Kang et al. | |
| 2011/0201269 A1 | 8/2011 | Hobbs et al. | |
| 2013/0077502 A1 | 3/2013 | Gainey et al. | |
| 2013/0077602 A1 | 3/2013 | Gainey et al. | |
| 2013/0177047 A1 | 7/2013 | Kwak et al. | |
| 2014/0011442 A1 | 1/2014 | Dussmann | |
| 2014/0169501 A1 | 6/2014 | Nazararthy et al. | |
| 2015/0009889 A1 | 1/2015 | Zhan | |
| 2015/0029909 A1 | 1/2015 | Ashworth et al. | |
| 2016/0036403 A1 | 2/2016 | Ashworth et al. | |
| 2016/0211928 A1 | 7/2016 | Brewer et al. | |
| 2018/0048293 A1 | 2/2018 | Gathman et al. | |
| 2018/0070323 A1 | 3/2018 | Zhan | |

FOREIGN PATENT DOCUMENTS

| | | |
|---|---|---|
| CN | 103812581 A | 5/2014 |
| CN | 104205934 A | 12/2014 |
| CN | 204031176 U | 12/2014 |
| EP | 0406905 A2 | 1/1991 |
| EP | 1324514 A2 | 7/2003 |
| EP | 1525678 B1 | 7/2008 |
| WO | WO 2017031194 A1 | 2/2017 |

OTHER PUBLICATIONS

ADL5513; "1 MHz to 4 GHz, 80 dB Logarithmic Detector / Controller;" Data Sheet; (2008); 25 pages.
HMC713LP3E; "54 dB, Logarithmic Detector / Controller, 50-8000 MHz;" Data Sheet; (2010); 12 pages.
HMC909LP4E; "RMS Power Detector Single-Ended, DC—5.8 GHz;" Data Sheet; (2010); 21 pages.
PIC16F873; "28/40-Pin 8-Bit CMOS FLASH Microcontrollers;" Data Sheet; (2001); 218 pages.

* cited by examiner

INTERMEDIATE FREQUENCY (IF) FILTERING FOR ENHANCED CROSSOVER ATTENUATION IN A REPEATER

RELATED APPLICATIONS

The present application claims the benefit of U.S. Provisional Patent Application No. 62/737,761 filed Sep. 27, 2018, the entire specification of which is hereby incorporated by reference in its entirety for all purposes.

BACKGROUND

Signal boosters and repeaters can be used to increase the quality of wireless communication between a wireless device and a wireless communication access point, such as a cell tower. Repeaters can enhance the quality of the wireless communication by amplifying, filtering, and/or applying other processing techniques to uplink and downlink signals communicated between the wireless device and the wireless communication access point.

As an example, the repeater can receive, via an antenna, downlink signals from the wireless communication access point. The repeater can amplify the downlink signal and then provide an amplified downlink signal to the wireless device. In other words, the repeater can act as a relay between the wireless device and the wireless communication access point. As a result, the wireless device can receive a stronger signal from the wireless communication access point. Similarly, uplink signals from the wireless device (e.g., telephone calls and other data) can be directed to the repeater. The repeater can amplify the uplink signals before communicating, via an antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
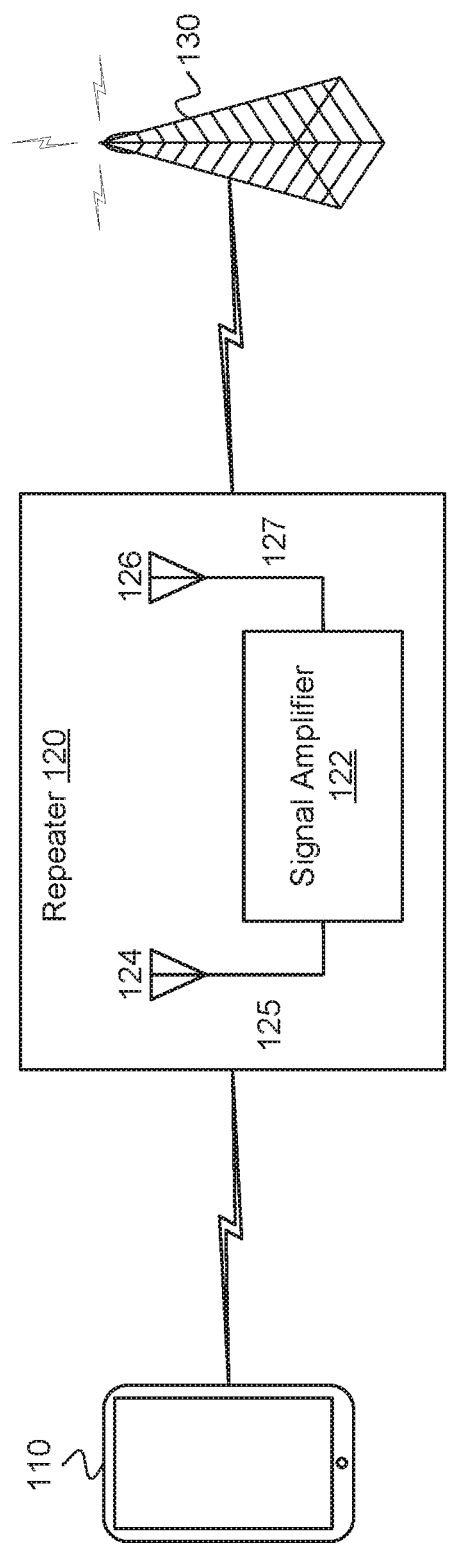
FIG. 1 illustrates a repeater in communication with a wireless device and a base station in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 illustrates an exemplary repeater 120 in communication with a wireless device 110 and a base station 130. The repeater 120 can be referred to as a repeater. A repeater can be an electronic device used to amplify (or boost) signals. The repeater 120 (also referred to as a cellular signal amplifier) can enhance the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the repeater 120 can amplify or boost uplink signals and/or downlink signals bi-directionally. In one example, the repeater 120 can be at a fixed location, such as in a home or office. Alternatively, the repeater 120 can be attached to a mobile object, such as a vehicle or a wireless device 110.

In one configuration, the repeater 120 can include an integrated device antenna 124 (e.g., an inside antenna or a coupling antenna) and an integrated node antenna 126 (e.g., an outside antenna). The integrated node antenna 126 can receive the downlink signal from the base station 130. The downlink signal can be provided to the signal amplifier 122 via a second coaxial cable 127 or other type of radio frequency connection operable to communicate radio frequency signals. The signal amplifier 122 can include one or more cellular signal amplifiers for amplification and filtering. The downlink signal that has been amplified and filtered can be provided to the integrated device antenna 124 via a first coaxial cable 125 or other type of radio frequency connection operable to communicate radio frequency signals. The integrated device antenna 124 can wirelessly communicate the downlink signal that has been amplified and filtered to the wireless device 110.

Similarly, the integrated device antenna 124 can receive an uplink signal from the wireless device 110. The uplink signal can be provided to the signal amplifier 122 via the first coaxial cable 125 or other type of radio frequency connection operable to communicate radio frequency signals. The signal amplifier 122 can include one or more cellular signal amplifiers for amplification and filtering. The uplink signal that has been amplified and filtered can be provided to the integrated node antenna 126 via the second coaxial cable 127 or other type of radio frequency connection operable to communicate radio frequency signals. The integrated device antenna 126 can communicate the uplink signal that has been amplified and filtered to the base station 130.

In one example, the repeater 120 can filter the uplink and downlink signals using any suitable analog or digital filtering technology including, but not limited to, surface acoustic wave (SAW) filters, bulk acoustic wave (BAW) filters, film bulk acoustic resonator (FBAR) filters, ceramic filters, waveguide filters or low-temperature co-fired ceramic (LTCC) filters.

In one example, the repeater 120 can send uplink signals to a node and/or receive downlink signals from the node. The node can comprise a wireless wide area network (WWAN) access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or another type of WWVAN access point.

In one configuration, the repeater 120 used to amplify the uplink and/or a downlink signal is a handheld booster. The handheld booster can be implemented in a sleeve of the wireless device 110. The wireless device sleeve can be attached to the wireless device 110, but can be removed as needed. In this configuration, the repeater 120 can automatically power down or cease amplification when the wireless device 110 approaches a particular base station. In other words, the repeater 120 can determine to stop performing signal amplification when the quality of uplink and/or downlink signals is above a defined threshold based on a location of the wireless device 110 in relation to the base station 130.

In one example, the repeater 120 can include a battery to provide power to various components, such as the signal amplifier 122, the integrated device antenna 124 and the integrated node antenna 126. The battery can also power the wireless device 110 (e.g., phone or tablet). Alternatively, the repeater 120 can receive power from the wireless device 110.

In one configuration, the repeater 120 can be a Federal Communications Commission (FCC)-compatible consumer signal booster. As a non-limiting example, the repeater 120 can be compatible with FCC Part 20 or 47 Code of Federal Regulations (C.F.R.) Part 20.21 (Mar. 21, 2013). In addition, the repeater 120 can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R. The repeater 120 can be configured to automatically self-monitor its operation to ensure compliance with applicable noise and gain limits. The repeater 120 can either self-correct or shut down automatically if the repeater's operations violate the regulations defined in 47 CFR Part 20.21.

In one configuration, the repeater 120 can enhance the wireless connection between the wireless device 110 and the base station 130 (e.g., cell tower) or another type of wireless wide area network (WWAN) access point (AP) by amplifying desired signals relative to a noise floor. The repeater 120 can boost signals for cellular standards, such as the Third Generation Partnership Project (3GPP) Long Term Evolution (LTE) Release 8, 9, 10, 11, 12, 13, 14, 15, or 16 standards or Institute of Electronics and Electrical Engineers (IEEE) 802.16. In one configuration, the repeater 120 can boost signals for 3GPP LTE Release 16.2.0 (July 2019) or other desired releases.

The repeater 120 can boost signals from the 3GPP Technical Specification (TS) 36.101 (Release 16 Jul. 2019) bands or LTE frequency bands. For example, the repeater 120 can boost signals from the LTE frequency bands: 2, 4, 5, 12, 13, 17, 25, and 26. In addition, the repeater 120 can boost selected frequency bands based on the country or region in which the repeater is used, including any of bands 1-85 or other bands, as disclosed in 3GPP TS 36.104 V16.2.0 (July 2019), and depicted in Table 1:

TABLE 1

| LTE Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 (NOTE 1) | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |

TABLE 1-continued

| LTE Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 22 | 3410 MHz-3490 MHz | 3510 MHz-3590 MHz | FDD |
| 23[1] | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD (NOTE 2) |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A | 1452 MHz-1496 MHz | FDD (NOTE 2) |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |
| 45 | 1447 MHz-1467 MHz | 1447 MHz-1467 MHz | TDD |
| 46 | 5150 MHz-5925 MHz | 5150 MHz-5925 MHz | TDD (NOTE 3, NOTE 4) |
| 47 | 5855 MHz-5925 MHz | 5855 MHz-5925 MHz | TDD |
| 48 | 3550 MHz-3700 MHz | 3550 MHz-3700 MHz | TDD |
| 49 | 3550 MHz-3700 MHz | 3550 MHz-3700 MHz | TDD (NOTE 8) |
| 50 | 1432 MHz-1517 MHz | 1432 MHz-1517 MHz | TDD |
| 51 | 1427 MHz-1432 MHz | 1427 MHz-1432 MHz | TDD |
| 52 | 3300 MHz-3400 MHz | 3300 MHz-3400 MHz | TDD |
| 53 | 2483.5 MHz-2495 MHz | 2483.5 MHz-2495 MHz | TDD |
| 65 | 1920 MHz-2010 MHz | 2110 MHz-2200 MHz | FDD |
| 66 | 1710 MHz-1780 MHz | 2110 MHz-2200 MHz | FDD (NOTE 5) |
| 67 | N/A | 738 MHz-758 MHz | FDD (NOTE 2) |
| 68 | 698 MHz-728 MHz | 753 MHz-783 MHz | FDD |
| 69 | N/A | 2570 MHz-2620 MHz | FDD (NOTE 2) |
| 70 | 1695 MHz-1710 MHz | 1995 MHz-2020 MHz | FDD[6] |
| 71 | 663 MHz-698 MHz | 617 MHz-652 MHz | FDD |
| 72 | 451 MHz-456 MHz | 461 MHz-466 MHz | FDD |
| 73 | 450 MHz-455 MHz | 460 MHz-465 MHz | FDD |
| 74 | 1427 MHz-1470 MHz | 1475 MHz-1518 MHz | FDD |
| 75 | N/A | 1432 MHz-1517 MHz | FDD (NOTE 2) |
| 76 | N/A | 1427 MHz-1432 MHz | FDD (NOTE 2) |
| 85 | 698 MHz-716 MHz | 728 MHz-746 MHz | FDD |
| 87 | 410 MHz-415 MHz | 420 MHz-425 MHz | FDD |
| 88 | 412 MHz-417 MHz | 422 MHz-427 MHz | FDD |

(NOTE 1):
Band 6, 23 are not applicable.
(NOTE 2):
Restricted to E-UTRA operation when carrier aggregation is configured. The downlink operating band is paired with the uplink operating band (external) of the carrier aggregation configuration that is supporting the configured Pcell.
(NOTE 3):
This band is an unlicensed band restricted to licensed-assisted operation using Frame Structure Type 3.
(NOTE 4):
Band 46 is divided into four sub-bands as in Table 5.5-1A.
(NOTE 5):
The range 2180-2200 MHz of the DL operating band is restricted to E-UTRA operation when carrier aggregation is configured.
(NOTE 6):
The range 2010-2020 MHz of the DL operating band is restricted to E-UTRA operation when carrier aggregation is configured and TX-RX separation is 300 MHz. The range 2005-2020 MHz of the DL operating band is restricted to E-UTRA operation when carrier aggregation is configured and TX-RX separation is 295 MHz.
(NOTE 7):
Void
(NOTE 8):
This band is restricted to licensed-assisted operation using Frame Structure Type 3.

In another configuration, the repeater 120 can boost signals from the 3GPP Technical Specification (TS) 38.104 (Release 16 Jul. 2019) bands or 5G frequency bands. In addition, the repeater 120 can boost selected frequency bands based on the country or region in which the repeater is used, including any of bands n1-n86 in frequency range 1 (FR1), n257-n261 in frequency range 2 (FR2), or other bands, as disclosed in 3GPP TS 38.104 V16.0.0 (July 2019), and depicted in Table 2 and Table 3:

TABLE 2

| NR operating band | Uplink (UL) operating band BS receive/UE transmit $F_{UL, low}$-$F_{UL, high}$ | Downlink (DL) operating band BS transmit/UE receive $F_{DL, low}$-$F_{DL, high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n14 | 788 MHz-798 MHz | 758 MHz-768 MHz | FDD |
| n18 | 815 MHz-830 MHz | 860 MHz-875 MHz | FDD |
| n20 | 832 MHz-862 MHz | 791 MHz-821 MHz | FDD |
| n25 | 1850 MHz-1915 MHz | 1930 MHz-1995 MHz | FDD |
| n28 | 703 MHz-748 MHz | 758 MHz-803 MHz | FDD |
| n30 | 2305 MHz-2315 MHz | 2350 MHz-2360 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n48 | 3550 MHz-3700 MHz | 3550 MHz-3700 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n65 | 1920 MHz-2010 MHz | 2110 MHz-2200 MHz | FDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |
| [n90] | 2496 MHz-2690 MHz | 2496 MHz-2690 MHz | TDD |

TABLE 3

| NR operating band | Uplink (UL) and Downlink (DL) operating band BS transmit/receive UE transmit/receive $F_{UL, low}$-$F_{UL, high}$ $F_{DL, low}$-$F_{DL, high}$ | Duplex Mode |
|---|---|---|
| n257 | 26500 MHz-29500 MHz | TDD |
| n258 | 24250 MHz-27500 MHz | TDD |
| n260 | 37000 MHz-40000 MHz | TDD |
| n261 | 27500 MHz-28350 MHz | TDD |

The number of LTE or 5G frequency bands and the level of signal enhancement can vary based on a particular wireless device, cellular node, or location. Additional domestic and international frequencies can also be included to offer increased functionality. Selected models of the repeater 120 can be configured to operate with selected frequency bands based on the location of use. In another example, the repeater 120 can automatically sense from the wireless device 110 or base station 130 (or GPS, etc.) which frequencies are used, which can be a benefit for international travelers.

In one example, the integrated device antenna 124 and the integrated node antenna 126 can be comprised of a single antenna, an antenna array, or have a telescoping form-factor. In another example, the integrated device antenna 124 and the integrated node antenna 126 can be a microchip antenna. An example of a microchip antenna is AMMAL001. In yet another example, the integrated device antenna 124 and the integrated node antenna 126 can be a printed circuit board (PCB) antenna. An example of a PCB antenna is TE 2118310-1.

In one example, the integrated device antenna 124 can receive uplink (UL) signals from the wireless device 110 and transmit DL signals to the wireless device 110 using a single antenna. Alternatively, the integrated device antenna 124 can receive UL signals from the wireless device 110 using a dedicated UL antenna, and the integrated device antenna 124 can transmit DL signals to the wireless device 110 using a dedicated DL antenna.

In one example, the integrated device antenna 124 can communicate with the wireless device 110 using near field communication. Alternatively, the integrated device antenna 124 can communicate with the wireless device 110 using far field communication.

In one example, the integrated node antenna 126 can receive downlink (DL) signals from the base station 130 and transmit uplink (UL) signals to the base station 130 via a single antenna. Alternatively, the integrated node antenna 126 can receive DL signals from the base station 130 using a dedicated DL antenna, and the integrated node antenna 126 can transmit UL signals to the base station 130 using a dedicated UL antenna.

In one configuration, multiple repeaters can be used to amplify UL and DL signals. For example, a first repeater can be used to amplify UL signals and a second repeater can be used to amplify DL signals. In addition, different repeaters can be used to amplify different frequency ranges.

In one configuration, the repeater 120 can be configured to identify when the wireless device 110 receives a relatively strong downlink signal. An example of a strong downlink signal can be a downlink signal with a signal strength greater than approximately −80 dBm. The repeater 120 can be configured to automatically turn off selected features, such as amplification, to conserve battery life. When the repeater 120 senses that the wireless device 110 is receiving a relatively weak downlink signal, the integrated booster can be configured to provide amplification of the downlink signal. An example of a weak downlink signal can be a downlink signal with a signal strength less than −80 dBm.

In one example, the repeater 120 can also include one or more of: a waterproof casing, a shock absorbent casing, a flip-cover, a wallet, or extra memory storage for the wireless device. In one example, extra memory storage can be achieved with a direct connection between the repeater 120 and the wireless device 110. In another example, Near-Field Communications (NFC), Bluetooth v4.0, Bluetooth Low Energy, Bluetooth v4.1, Bluetooth v4.2, Bluetooth 5, Bluetooth 5.1, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, or IEEE 802.11ax can be used to couple the repeater 120 with the wireless device 110 to enable data from the wireless device 110 to be communicated to and stored in the extra memory storage that is integrated in the repeater 120. Alternatively, a connector can be used to connect the wireless device 110 to the extra memory storage.

In one example, the repeater 120 can include photovoltaic cells or solar panels as a technique of charging the integrated battery and/or a battery of the wireless device 110. In another example, the repeater 120 can be configured to communicate directly with other wireless devices with repeaters. In one example, the integrated node antenna 126 can communicate over Very High Frequency (VHF) communications directly with integrated node antennas of other repeaters. The repeater 120 can be configured to communicate with the wireless device 110 through a direct connection, Near-Field Communications (NFC), Bluetooth v4.0, Bluetooth Low Energy, Bluetooth v4.1, Bluetooth v4.2, Bluetooth 5, Bluetooth 5.1, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, IEEE 802.11ax, a TV White Space Band (TVWS), or any other industrial, scientific and medical (ISM) radio band. Examples of such ISM bands include 2.4 GHz, 3.6 GHz, 4.9 GHz, 5 GHz, or 5.9 GHz. This configuration can allow data to pass at high rates between multiple wireless devices with repeaters. This configuration can also allow users to send text messages, initiate phone calls, and engage in video communications between wireless devices with repeaters. In one example, the integrated node antenna 126 can be configured to couple to the wireless device 110. In other words, communications between the integrated node antenna 126 and the wireless device 110 can bypass the integrated booster.

In another example, a separate VHF node antenna can be configured to communicate over VHF communications directly with separate VHF node antennas of other repeaters. This configuration can allow the integrated node antenna 126 to be used for simultaneous cellular communications. The separate VHF node antenna can be configured to communicate with the wireless device 110 through a direct connection, Near-Field Communications (NFC), Bluetooth v4.0, Bluetooth Low Energy, Bluetooth v4.1, Bluetooth v4.2, Bluetooth 5, Bluetooth 5.1, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11 ad, IEEE 802.11 ax, a TV White Space Band (TVWS), or any other industrial, scientific and medical (ISM) radio band.

In one configuration, the repeater 120 can be configured for satellite communication. In one example, the integrated node antenna 126 can be configured to act as a satellite communication antenna. In another example, a separate node antenna can be used for satellite communications. The repeater 120 can extend the range of coverage of the wireless device 110 configured for satellite communication. The integrated node antenna 126 can receive downlink signals from satellite communications for the wireless device 110. The repeater 120 can filter and amplify the downlink signals from the satellite communication. In another example, during satellite communications, the wireless device 110 can be configured to couple to the repeater 120 via a direct connection or an ISM radio band. Examples of such ISM bands include 2.4 GHz, 3.6 GHz, 4.9 GHz, 5 GHz, or 5.9 GHz.

In one configuration, in traditional signal boosters (or repeaters) with separate uplink and downlink signal paths, uplink and downlink filters can pass uplink and downlink signals, respectively, but each can have a certain level of roll-off. There can be a loop problem where the two filters cross in the middle of the guard band. The middle of the guard band can correspond to where the two filters will typically cross, and this point can be amplified on uplink and downlink. To ensure that this amplification is below a certain level, the repeater can be subject to a midband isolation (or crossover isolation) requirement, which requires that there should be more midband isolation than loop gain. Satisfying the midband isolation requirement can prevent signals from crossing from uplink to downlink and then becoming re-amplified, which can cause internal oscillation. Thus, there should be more midband isolation than loop gain at that midband point (or crossover point), which can be achievable using filters. The filters can start filtering before the passband ends in order to obtain enough attenuation at that midband point. Therefore, the filters can be designed to achieve sufficient midband isolation.

Figure 2:
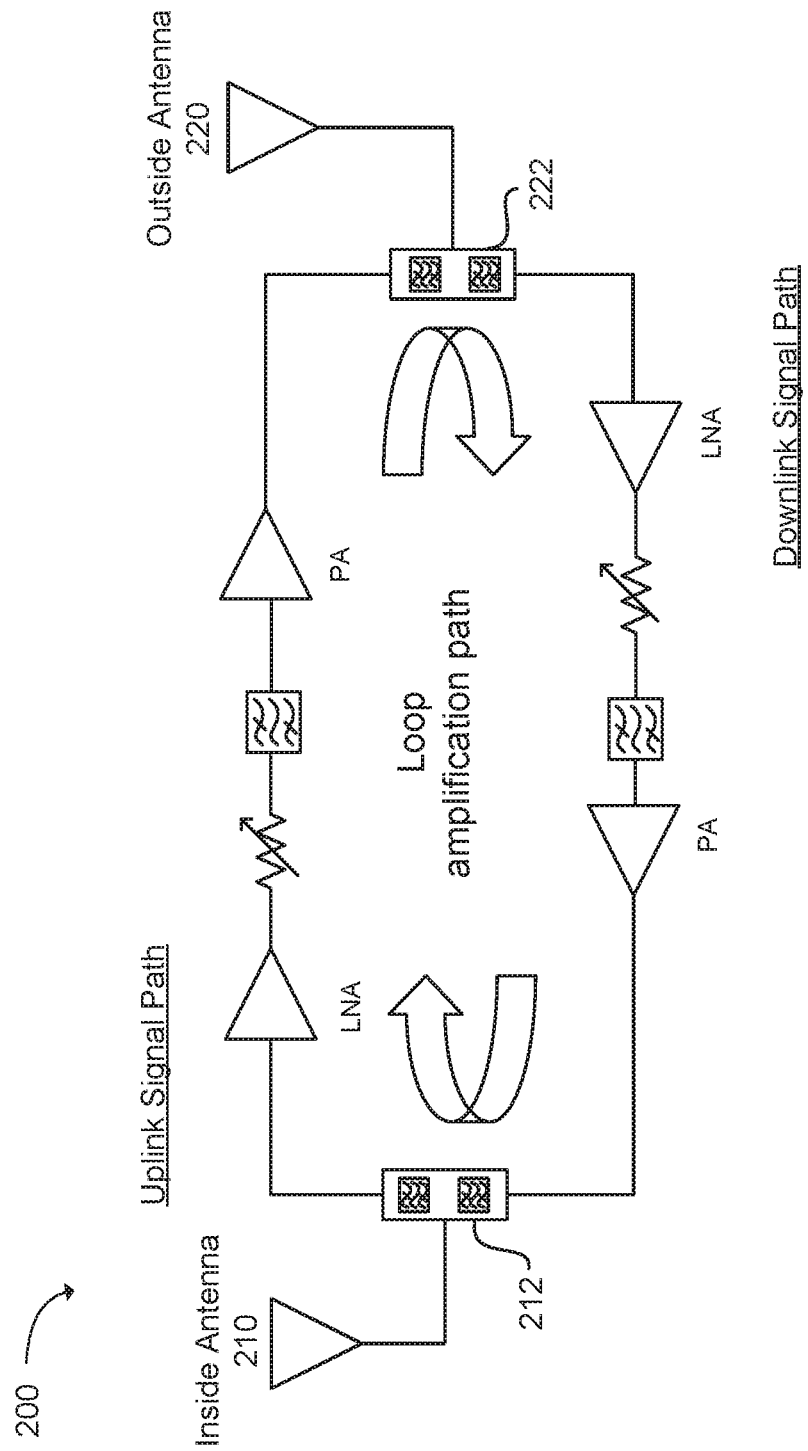
FIG. 2 illustrates midband (or crossover) isolation in a repeater in accordance with an example.

FIG. 2 illustrates an exemplary signal booster 200 (or repeater). The repeater 200 can include an inside antenna 210 and a first duplexer 212 communicatively coupled to the inside antenna 210. The repeater 200 can include an outside antenna 220 and a second duplexer 222 communicatively coupled to the outside antenna 220. The repeater 200 can include an uplink signal path and a downlink signal path. The uplink signal path and the downlink signal path can be communicatively coupled between the first duplexer 212 and the second duplexer 222.

In one example, the uplink signal path can include a low noise amplifier (LNA), a bandpass filter and a power amplifier (PA). Similarly, the downlink signal path can include a LNA, a bandpass filter and a PA. As an example, in the downlink, there can be 20 decibels (dB) of gain per LNA and PA, which can result in 40 dB of downlink gain. As an example, in the uplink, there can be 20 dB of gain per LNA and PA, which can result in 40 dB of uplink gain. In the downlink, there can be 2 dB of loss per passive component or bandpass filter (i.e., a total of 6 dB of loss for the LNA, the bandpass filter and the PA in the downlink signal path). Similarly, in the uplink, there can be 2 dB of loss per passive component or bandpass filter (i.e., a total of 6 dB of loss for the LNA, the bandpass filter and the PA in the uplink signal path). Therefore, the total loop gain in the repeater 200 can be 68 dB. In addition, there can be a requirement of 12 dB of midband isolation in each bandpass filter (two filters total) and a requirement of 30 dB of midband isolation in each duplexer (two duplexers total), which results in a total loop midband isolation requirement of 84 dB. Since the total loop midband isolation should be greater than the total loop gain, this configuration would be acceptable (i.e., 84 dB of total loop midband isolation is greater than 68 dB of total loop gain).

However, in this example, increasing the uplink gain and/or the downlink gain without increasing the number of bandpass filters in the uplink signal path and/or the downlink signal path may cause the total loop midband isolation to not be greater than the total loop gain. In other words, in this example, the total loop midband isolation may be less than the total loop gain. In this case, the configuration of the repeater 200 would not be acceptable.

Figure 3:
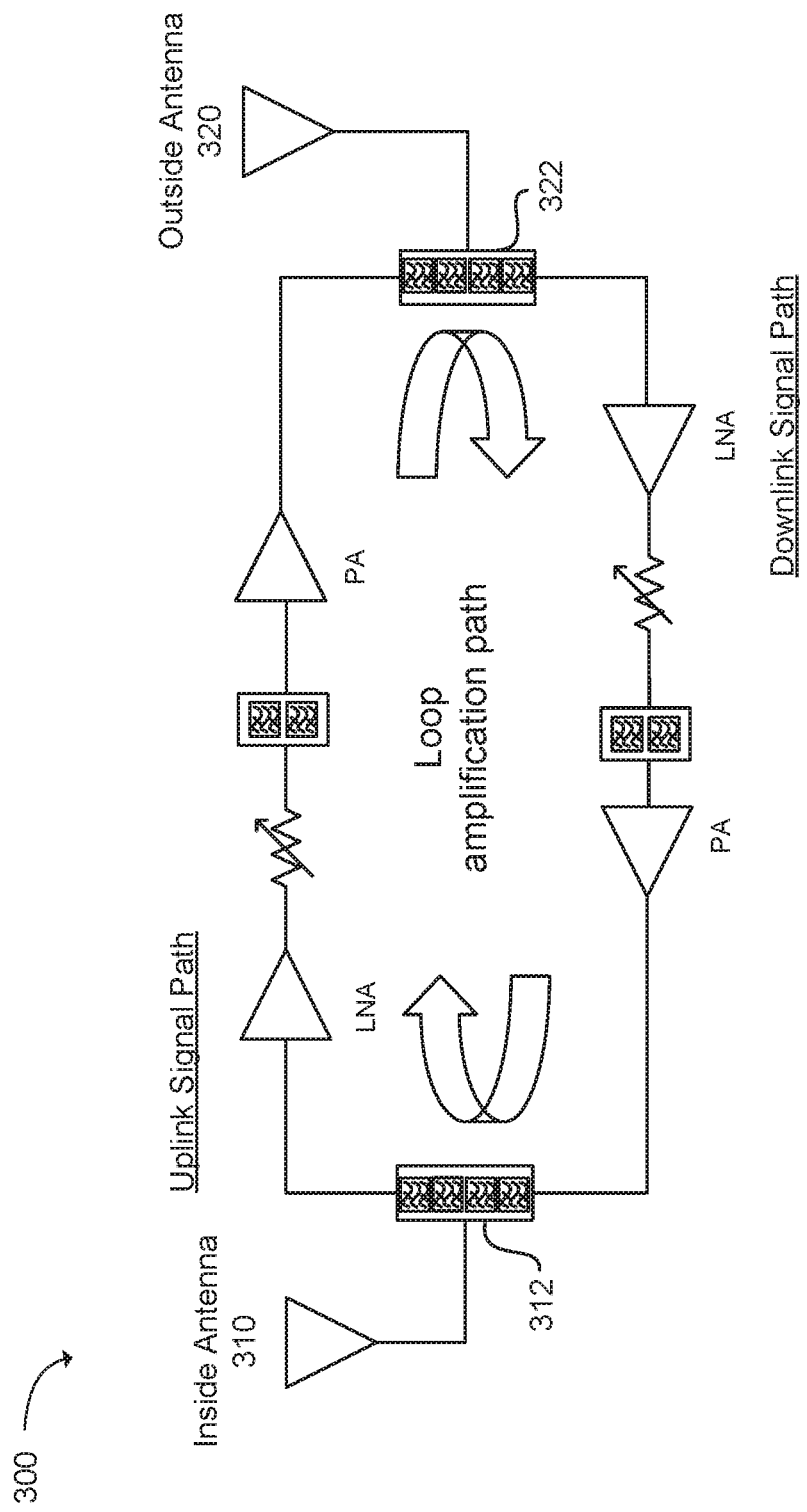
FIG. 3 illustrates midband isolation in a repeater in accordance with an example.

FIG. 3 illustrates an exemplary signal booster 300 (or repeater). The repeater 300 can include an inside antenna 310 and a first duplexer 312 communicatively coupled to the inside antenna 310. The repeater 300 can include an outside antenna 320 and a second duplexer 322 communicatively coupled to the outside antenna 320. The repeater 300 can include an uplink signal path and a downlink signal path. The uplink signal path and the downlink signal path can be communicatively coupled between the first duplexer 312 and the second duplexer 322. In this example, the first duplexer 312 and the second duplexer 324 can be dual-input single-output (DISO) analog bandpass filters.

In one example, the uplink signal path can include a low noise amplifier (LNA), a bandpass filter and a power amplifier (PA). Similarly, the downlink signal path can include a LNA, a bandpass filter and a PA. In this example, the bandpass filters in the uplink signal path and the downlink signal path can be single-input single-output (SISO) analog bandpass filters. As an example, in the downlink, there can be 20 dB of gain per LNA and PA, which can result in 40 dB of downlink gain. As an example, in the uplink, there can be 20 dB of gain per LNA and PA, which can result in 40 dB of uplink gain. In the downlink, there can be 2 dB of loss per passive component or bandpass filter (i.e., a total of 6 dB of loss for the LNA, the bandpass filter and the PA in the downlink signal path). Similarly, in the uplink, there can be 2 dB of loss per passive component or bandpass filter (i.e., a total of 6 dB of loss for the LNA, the bandpass filter and the PA in the uplink signal path). Therefore, the total loop gain in the repeater 200 can be 68 dB. In addition, there can be a requirement of 12 dB of midband isolation in each bandpass filter (two filters total) and a requirement of 30 dB of midband isolation in each duplexer (two duplexers total), which results in a total loop midband isolation requirement of 84 dB. Since the total loop midband isolation should be greater than the total loop gain, this configuration would be acceptable (i.e., 84 dB of total loop midband isolation is greater than 68 dB of total loop gain).

In one configuration, a bi-directional frequency division duplex (FDD) signal booster (or repeater) is described. The bi-directional FDD repeater can transmit on an uplink and on a downlink at a same time. For certain bands, a guard band between uplink and downlink frequencies can be very narrow, and the repeater can internally oscillate when there is insufficient filtering. More specifically, a most difficult-to-filter point can be a midband or crossover point, which can be in the middle of the guard band between the uplink and downlink frequencies.

In one example, in order to enhance the midband isolation (or crossover attenuation) in the repeater, the repeater can implement a full-band intermediate frequency (IF) down conversion architecture. The repeater can include an IF filter that passes a whole band (as opposed to a reduced or channelized portion of the whole band). The full-band usage of the IF filter can provide enhanced midband isolation (or crossover attenuation), which can result in fewer RF bandpass filters in the repeater. In other words, the IF filter can provide the midband isolation (or crossover attenuation) instead of using RF bandpass filters to provide the midband isolation. The reduction in RF bandpass filters can lead to reduced repeater amplitude ripple and a flatter passband with respect to a system performance rather than a specific filter performance.

In one example, when data is transmitted, the data can be modulated onto a signal that is carried on a carrier, referred to as an IF carrier. The IF carrier can typically be a low frequency, such as a frequency in the 100 Megahertz (MHz) range. The selected IF frequency can be dependent on a bandwidth of the signal, among other factors. This modulated IF carrier can be upconverted by mixing the signal with another signal to form a radio frequency (RF) carrier signal. The RF carrier signal can be selected based on a portion of the electromagnetic spectrum on which the signal will be transmitted. For example, a 100 MHz center-frequency IF signal can be mixed with a 1750 MHz continuous-wave (CW) signal to form an 1850 MHz RF carrier signal.

In one example, in the repeater, both the uplink signal and the downlink signal can be separately amplified. One requirement is to provide a certain level of midband isolation (or crossover attenuation). An amount of gain in the uplink signal and an amount of gain in the downlink signal can be added together at a location where the uplink signal crosses with the downlink signal (with respect to gain and frequency). This location can be referred to as a midband or crossover point. The midband or crossover point can be outside of either the uplink or downlink passbands, and can typically be at a center of a guard band between the two passbands. When a level of gain in a loop amplification path is greater than a level of isolation provided by filters, an oscillation can result in the repeater. In other words, the oscillation can be prevented when the level of isolation is greater than the level of gain.

In one example, with respect to RF filters, in order to achieve a midband isolation (or crossover attenuation) that provides a desired reduction in gain (or increase in isolation) at the midband (crossover), the RF filters can often be designed to begin rolling off (attenuating) the signal prior to an edge of a passband. When looking at a curve for an RF filter, the passband can refer to the desired RF bandwidth and the passband roll-off can refer to a portion of the curve in which the curve slops away at an edge of the passband. Designing the RF filter to roll off in the passband can effectively reduce a useable RF bandwidth of the passband and can distort or reduce performance of the signal in the passband.

Therefore, the repeater can employ the full-band IF architecture to mitigate the problem of the bandwidth of the passband being reduced when the RF filter rolls off in the passband. With the full-band IF architecture in the repeater, by down converting the signal (i.e., using a mixer to reduce a RF carrier frequency to a desired IF frequency), the RF passband can become much wider relative to the carrier frequency. With the full-band IF architecture in the repeater, the RF filters can be designed to roll off outside the passband rather than inside the passband. Therefore, the full-band IF architecture can be used to pass the whole band and not roll off early (as in RF bandpass filters) to achieve the midband isolation (or crossover attenuation) (i.e., a reduction in gain at the midband or crossover point), thereby resulting in an increased passband.

In one example, with the full-band IF architecture, an IF filter bandwidth can be set as equal to or greater than an RF bandwidth. As an example, the IF filter bandwidth can be 2%, 5%, 10%, etc. greater than the RF bandwidth. The repeater can use full-band IF filtering in an RF system in order to obtain sharper filtering outside the passband while preserving the entire passband. In other words, the full-band IF filtering can be designed to wider-than-RF-bandwidth to achieve a flatter RF bandwidth response in the passband while providing a suitable midband or crossover selectivity outside the passband. The amount of midband or crossover selectivity from the full-band IF filtering can allow an RF filter selectivity at the midband (or crossover) point to be reduced, which can provide an enhanced passband ripple performance of the RF filtering as well.

In one example, the repeater can employ the IF architecture with respect to 3GPP LTE band 25 (B25). Generally, B25 can be difficult to achieve with RF bandpass filters, as an uplink RF carrier signal is 1850-1915 MHz and a downlink RF carrier signal is 1930-1995 MHz. The separation between the lowest frequency of the downlink and the upper frequency of the uplink, referred to as the guard band, is 15 MHz. The 15 MHz guard band is a small percentage of the total band (i.e., 15 MHz in relation to 1950 MHz). Therefore, when employing the IF architecture with respect to B25, an uplink RF band of 1850-1915 MHz can be down converted to an IF frequency of, for example, 250-315 MHz by mixing a 1600 MHz signal with the RF signal. The IF filter can be designed at a lower frequency (where the passband is still 65 MHz, but a center frequency is now 282.5 MHz, which results in an increased portion of the signal).

In one example, the repeater can down convert signal path(s) (e.g., an uplink and/or a downlink signal path) to an IF frequency or baseband frequency. The down conversion can provide additional midband isolation (or crossover attenuation) in the repeater. The down conversion can enable an entire passband to be passed as a result of achieving favorable midband isolation (or crossover attenuation), as many bands today require in-band roll-off, and can result in a reduction in the number of passband filter in the repeater (which undesirably cause additional ripple). The repeater can employ a standard IF bandpass filter with a wider band, as there is no need to roll off so quickly. Then, the signal path(s) can be up-converted back to RF (e.g., mixing a 1600 MHz signal with an IF signal to provide an original RF uplink band of 1850-1915 MHz). In one example, the down conversion to the IF frequency can enable a flatter passband amplitude ripple for a narrow guard band. In addition, the down conversion to the IF frequency can enable a full passband to be captured (as current RF filtering techniques start to roll-off in-band, which can cut off a portion of the passband).

In one example, the passband ripple can be decreased with the IF filter in the repeater, as compared to an RF bandpass filter (BPF). For example, amplitude ripple at 1930 MHz for an RF filter can be caused by the midband isolation (or crossover attenuation). In the past, attenuation would be started in the passband in order to achieve reasonable midband isolation (or crossover attenuation) at the middle of the guard band. With the IF architecture in the repeater, the RF BPFs can cover the whole band.

In one example, the IF filters can be less susceptible to temperature variation. As a result, a BPF passband for the repeater can account for reduced temperature variation. In other words, the temperature variation can be less with an IF filter versus an RF filter covering a same absolute bandwidth.

In one example, the IF bandpass filters can be single-input single-output (SISO) filters to match the RF bandpass filters, which can also be SISO filters.

Figure 4A:
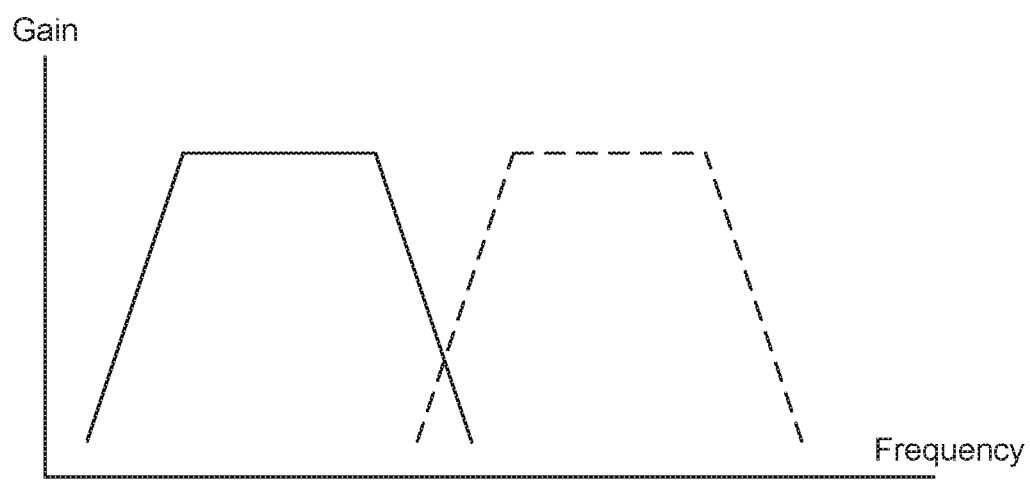
FIG. 4A illustrates midband (or crossover) isolation in accordance with an example.

FIG. 4A illustrates an example of midband (or crossover) isolation. As shown, at a location where an uplink signal and a downlink signal cross, an amount of gain in the uplink signal and an amount of gain in the downlink signal can be added together. Furthermore, when filters are designed for radio frequencies (i.e., RF filters), in order to achieve the midband (or crossover) isolation to provide a desired reduction in gain (isolation) at the midband (crossover), the filter can often be designed to begin rolling off (attenuating) the uplink or downlink signal prior to an edge of the passband. As shown, when looking at a curve for the filters, the passband can refer to a flat portion of the curve and the roll-off can refer to a portion of the curve in which the curve slops away at an end of the passband.

Figure 4B:
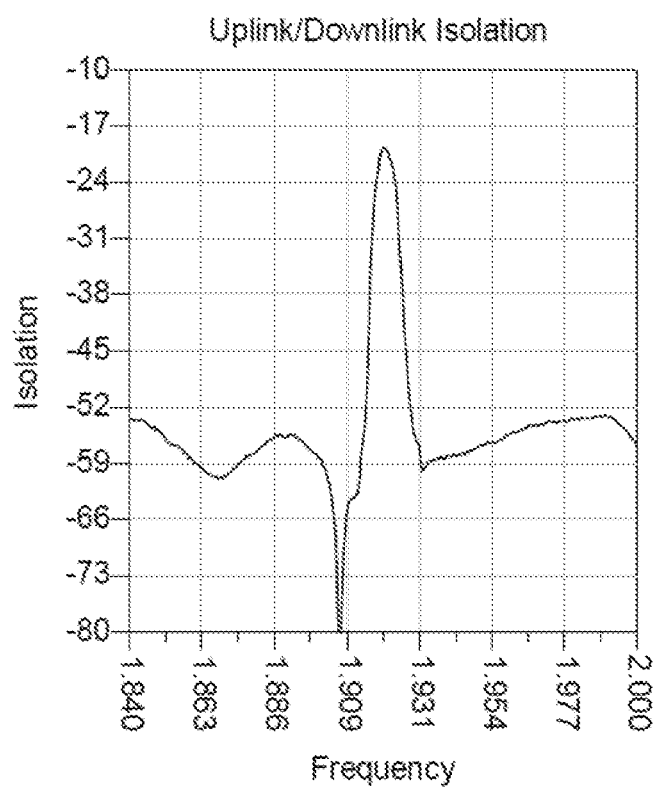
FIG. 4B illustrates a midband (or crossover) point in accordance with an example.

FIG. 4B illustrates an example of a midband (or crossover) point. Generally speaking, a most difficult-to-filter point can be a midband or crossover point, which can be in the middle of the guard band between the uplink and downlink frequencies. In the example shown, an amount of uplink/downlink isolation (in dB) can be lowest at the midband or crossover point between 1909 MHz and 1931 MHz, and it can be difficult to achieve sufficient filtering at this midband or crossover point. When there is insufficient filtering at a repeater, an internal oscillation can occur at the signal.

Figure 5:
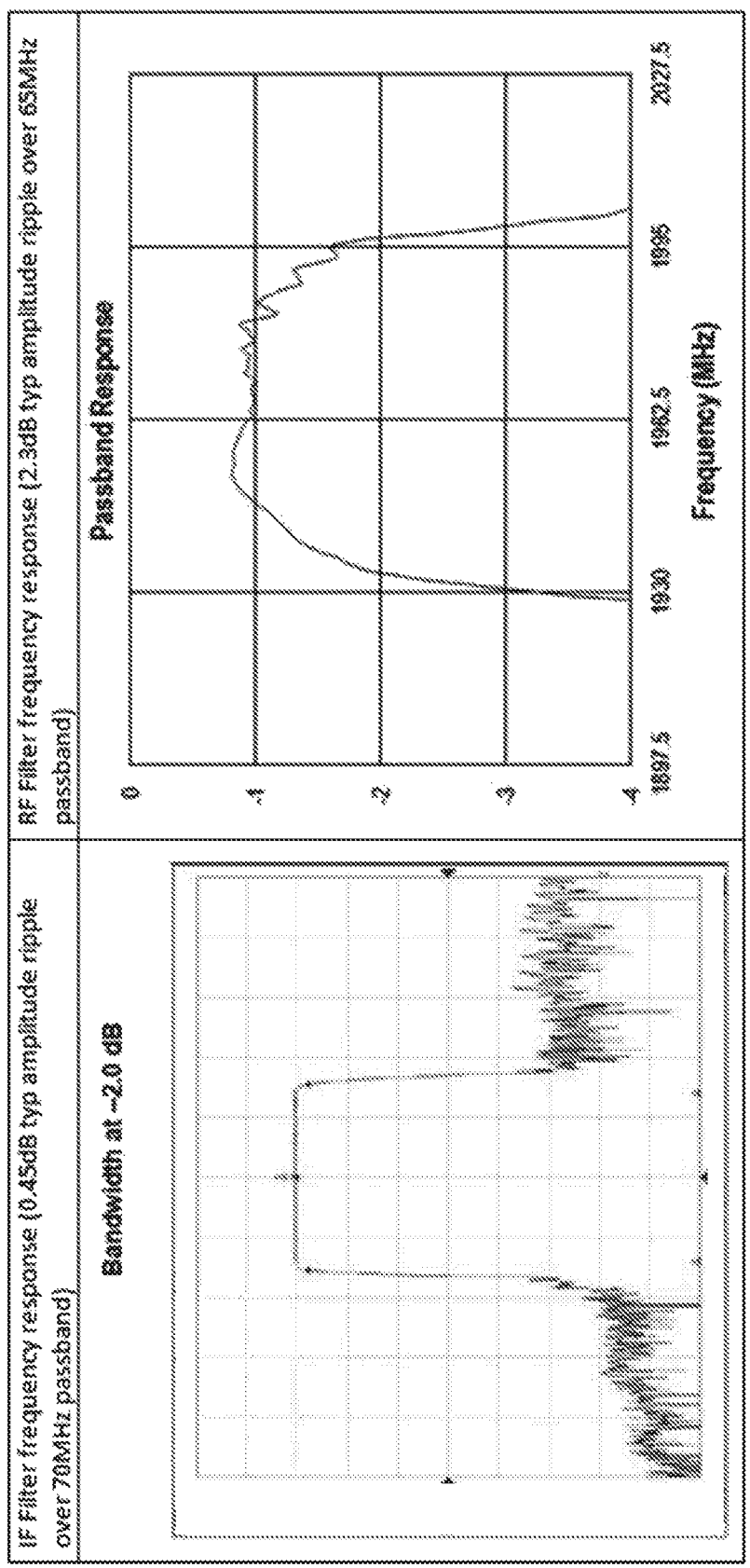
FIG. 5 illustrates a reduction of passband ripple when using intermediate frequency (IF) filters in a repeater in accordance with an example.

FIG. 5 illustrates an example of a reduction of passband ripple when using intermediate frequency (IF) filters in a repeater. As shown, an IF filter frequency response can have 0.45 dB of amplitude ripple over a 70 MHz passband, whereas an RF filter frequency response can have 2.3 dB of amplitude ripple over the 70 MHz passband. Thus, the passband ripple can be decreased with the IF filter in the repeater, as compared to an RF BPF. For example, amplitude ripple at 1930 MHz for an RF filter can be caused by the midband isolation (or crossover attenuation). In the past, attenuation would be started in the passband in order to achieve reasonable midband isolation (or crossover attenuation) at the middle of the guard band. With the IF architecture in the repeater, as discussed above, the RF BPFs can cover the whole band.

Figure 6:
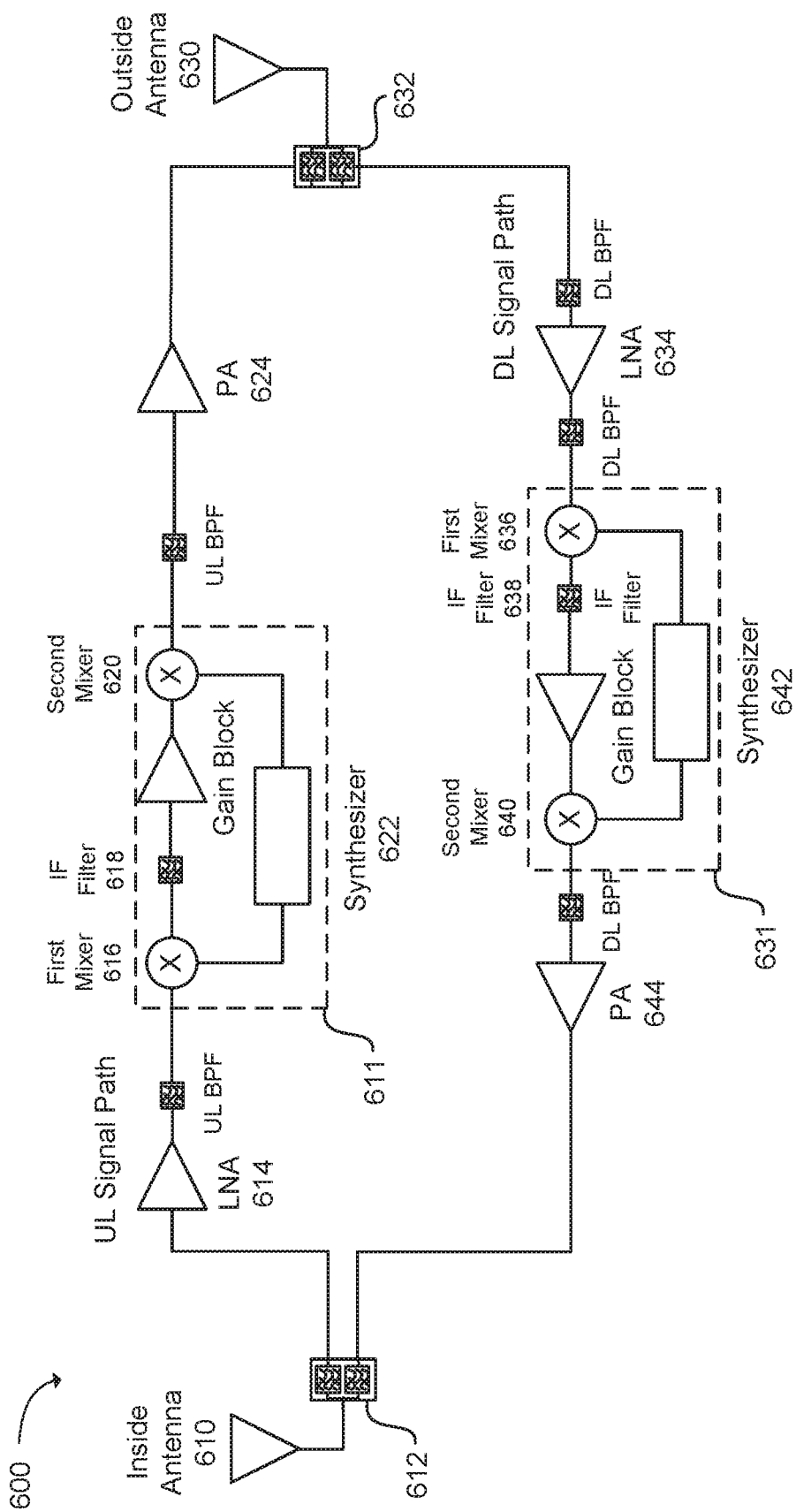
FIG. 6 illustrates a repeater with an intermediate frequency (IF) filter architecture in accordance with an example.

FIG. 6 illustrates an exemplary repeater 600 with an intermediate frequency (IF) filter down conversion architecture. The repeater 600 can also be referred to as a bi-directional frequency division duplex (FDD) signal booster (or repeater). The repeater 600 can include an IF filter 618, 638 that passes a whole band (as opposed to a channelized portion of the whole band). The repeater 600 can down convert and not channelize the band (i.e., a whole 3GPP band is used). The usage of the IF filter 618, 638 (or digital filters) for down conversion can provide enhanced midband isolation (or crossover attenuation), which can result in fewer RF bandpass filters in the repeater 600. In other words, the IF filter 618, 638 can provide the midband isolation (or crossover attenuation) instead of RF bandpass filters. The reduction in RF bandpass filters can lead to reduced amplitude ripple and a flatter passband.

In one example, the repeater 600 can employ the IF filter down conversion architecture to mitigate the problem of a bandwidth of a passband being reduced when the RF filter rolls off in the passband. With the IF filter down conversion architecture in the repeater 600, by down converting a signal (i.e., using a mixer to reduce a RF carrier frequency to a desired IF frequency), the passband can become much wider relative to the carrier frequency. With the IF filter down conversion architecture in the repeater 600, the IF filter 618, 638 can be designed to roll off early (e.g., the roll off can begin at the edge of the passband). Therefore, the IF filter down conversion architecture can be used to pass the whole band and not roll off early (as in RF bandpass filters) to achieve the midband isolation (or crossover attenuation) (i.e., a reduction in gain at the midband or crossover point), thereby resulting in an increased passband for the repeater 600.

In one example, with the IF filter down conversion architecture, an IF filter bandwidth can be set as equal to or greater than an RF bandwidth. The repeater 600 can use IF filtering in an RF system in order to obtain sharper filtering while preserving the entire passband. In other words, the IF filtering can be designed to wider-than-RF-bandwidth to achieve a flatter RF bandwidth response while providing midband or crossover selectivity. The amount of midband or crossover selectivity from the IF filtering can allow an RF filter selectivity at the midband (or crossover) point to be reduced, which can provide an enhanced passband ripple performance of the RF filtering as well.

In one example, the repeater 600 can include an inside antenna 610 and a first duplexer 612 communicatively coupled to the inside antenna 610. The repeater 600 can include an outside antenna 630 and a second duplexer 632 communicatively coupled to the outside antenna 630. The repeater 400 can include an uplink signal path and a downlink signal path. The uplink signal path and the downlink signal path can be communicatively coupled between the first duplexer 612 and the second duplexer 632. In this example, the first duplexer 612 and the second duplexer 632 can be dual-input single-output (DISO) analog bandpass filters.

In one example, rather than duplexers, the repeater 600 can employ another type of combiner, such as a splitter, circulator, etc. on the front-end of the repeater 600.

In one example, the uplink signal path can include a low noise amplifier (LNA) 614, one or more uplink bandpass filters, an IF filter block 611 and a power amplifier (PA) 624. The IF filter block 611 can include a first mixer 616, an IF filter 618, a gain block, a second mixer 620 and a synthesizer 622. Similarly, the downlink signal path can include an LNA 634, one or more downlink bandpass filters, an IF filter block 631 and a PA 644. The IF filter block 631 can include a first mixer 636, an IF filter 638, a gain block, a second mixer 640 and a synthesizer 642.

In one example, the IF filter block 611, 631 can down convert an uplink or downlink signal to reduce an RF carrier frequency to a desired IF frequency, which can result in a passband becoming much wider relative to the carrier frequency. The IF filter block 611, 631 can be used to pass the whole band and not roll off early (as in RF bandpass filters) to achieve the midband isolation (or crossover attenuation) (i.e., a reduction in gain at the midband or crossover point), thereby resulting in an increased passband for the repeater 600.

In one example, the repeater 600 can include uplink and downlink signal paths that carry a signal having a selected RF bandwidth on an RF carrier at a selected frequency. The uplink and downlink signal paths can include the IF filter block 611, 631, respectively. The IF filter block 611, 631 can be used to perform down-conversion of the RF carrier to an IF carrier to enable the selected RF bandwidth of the signal to be bandpass filtered at an IF filter bandwidth having an IF passband frequency range. The IF passband frequency range of the IF filter bandwidth can be equal to or greater than the selected RF bandwidth. The down-conversion to the IF carrier can provide increased crossover attenuation or midband isolation of the RF carrier. Furthermore, the IF filter block 611, 631 can perform up-conversion of the IF carrier to the RF carrier.

In one example, the repeater 600 can use IF filtering in an RF system to achieve sharper RF filtering and a flatter RF bandwidth response while providing crossover or midband selectivity and preserving an entire RF bandwidth. An amount of crossover or midband selectivity from the IF filtering can enable RF filter selectivity at a crossover or midband to be reduced, thereby enhancing a ripple performance of RF filtering at the bi-directional FDD repeater. In another example, the IF filter block 611, 631 cascaded with an equalizer (not shown) to create a flat IF filter passband response over an entire RF bandwidth, wherein a reduced IF frequency can enable the equalizer to achieve enhanced selectivity at a crossover or midband frequency. In addition, IF loss at the crossover frequency or midband frequency can reduce an RF crossover or midband selectivity requirement, thereby enabling reduced RF filter ripple. In yet another example, the down-conversion to the IF signal can reduce a number of passband filters in the uplink and downlink signal paths.

In one example, the repeater 600 can employ the IF filter down conversion architecture for B25. Generally, B25 can be difficult to achieve with RF bandpass filters, as an uplink RF carrier signal is 1850-1915 MHz and a downlink RF carrier signal is 1930-1995 MHz. The separation between the lowest frequency of the downlink and the upper frequency of the uplink, referred to as the guard band, is 15 MHz. The 15 MHz guard band is a small percentage of the total band (i.e., 15 MHz in relation to 1950 MHz). Therefore, when employing the IF filter down conversion architecture with respect to B25, a filter that spans 65 MHz from 1850-1915 MHz can be mixed down to an IF of 180 MHz to produce an IF that operates from 150-215 MHz. Now, the 15 MHz gap relative to the upper value of 215 MHz is a larger percentage bandwidth.

In one example, the outside antenna 630 in the repeater 600 can receive a downlink signal from a base station (not shown). The downlink signal can be passed from the outside antenna 630 to the second duplexer 632. The second duplexer 632 can direct the downlink signal to the downlink signal path. The downlink signal can be amplified and filtered using one or more amplifiers and one or more filters, respectively, on the downlink signal path. The downlink signal (which has been amplified and filtered) can be directed to the first duplexer 612, and then to the inside antenna 610 in the repeater 600. The inside antenna 610 can transmit the downlink signal to a mobile device (not shown).

In another example, the inside antenna 610 can receive an uplink signal from the mobile device. The uplink signal can be passed from the inside antenna 610 to the first duplexer 612. The first duplexer 612 can direct the uplink signal to the uplink signal path. The uplink signal can be amplified and filtered using one or more amplifiers and one or more filters, respectively, on the uplink signal path. The uplink signal (which has been amplified and filtered) can be directed to the second duplexer 632, and then to the outside antenna 630 in the repeater 600. The outside antenna 630 can transmit the uplink signal to the base station.

Figure 7A:
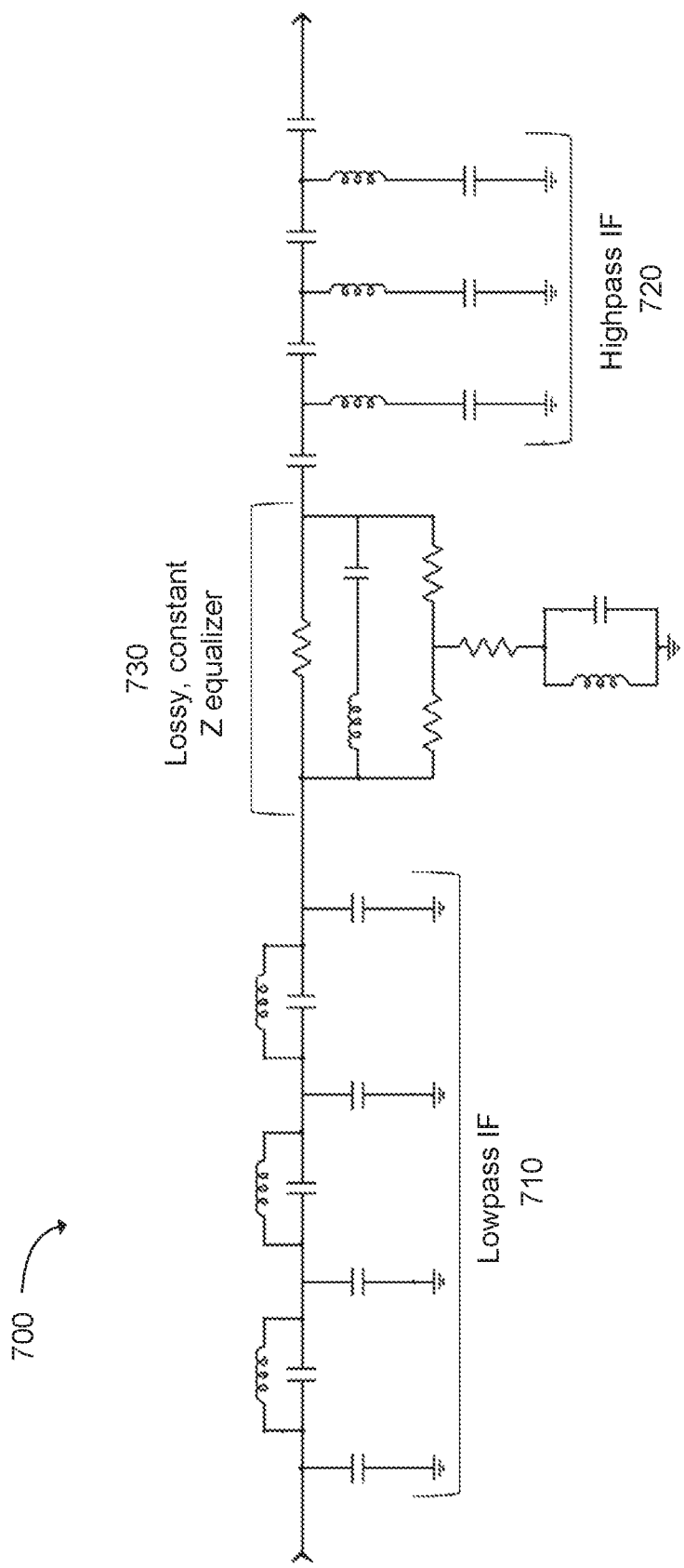
FIG. 7A illustrates a repeater architecture in accordance with an example.

FIG. 7A illustrates an example of a repeater architecture 700. The repeater architecture 700 can include a passive lowpass-equalizer-highpass (LP-Q-HP) path. More specifically, the repeater architecture can include a lowpass IF filter 710, a highpass IF filter 720, and a lossy constant Z equalizer 730 positioned in between the lowpass IF filter 710 and the highpass IF filter 720. In the repeater architecture 700, the IF filters 710 and 720 can be cascaded with the lossy equalizer 730 to create a flat IF filter passband response over an entire RF bandwidth.

Figure 7B:
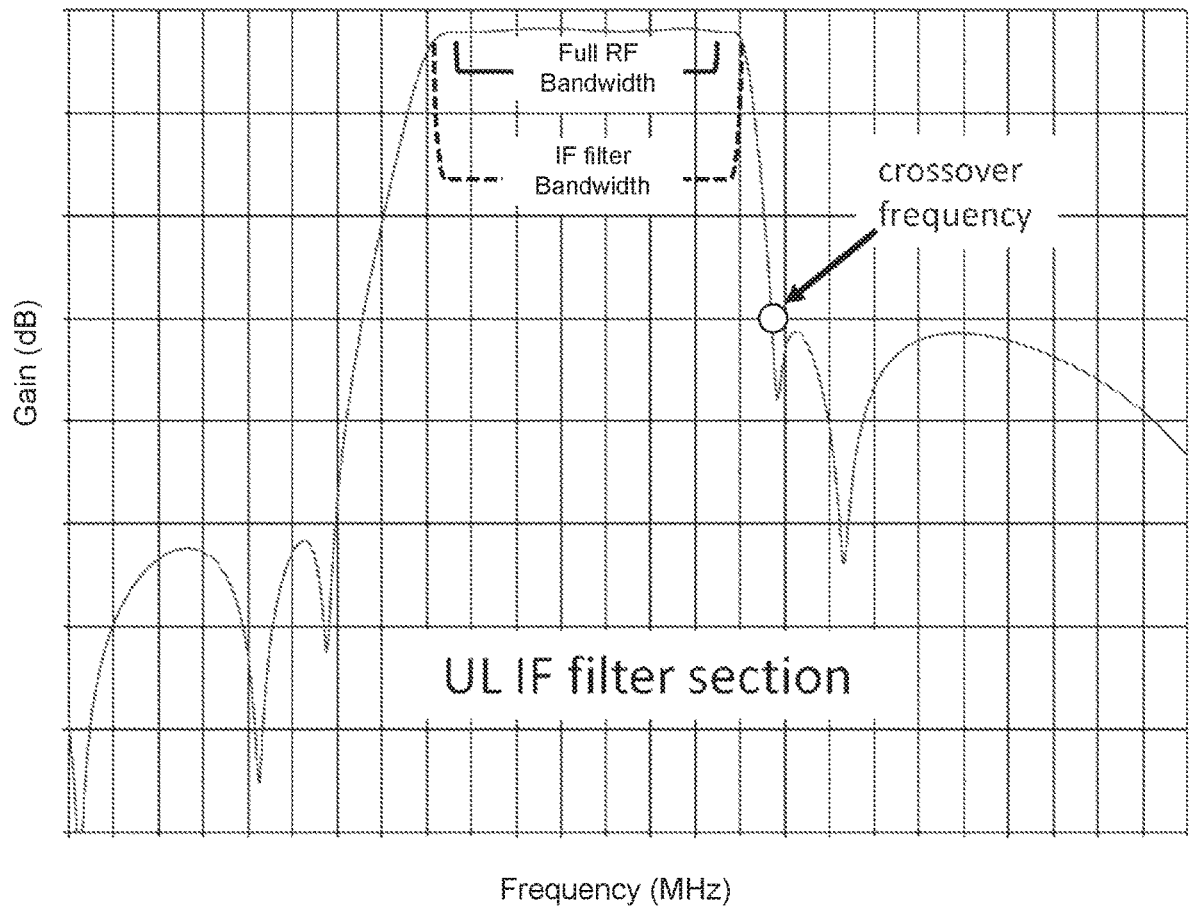
FIG. 7B illustrates a full radio frequency (RF) bandwidth and an intermediate frequency (IF) filter bandwidth in relation to a midband (or crossover) frequency in accordance with an example.

FIG. 7B illustrates an example of a full radio frequency (RF) bandwidth and an intermediate frequency (IF) filter bandwidth in relation to a midband (or crossover) frequency. The full RF bandwidth can be equal to or less than the IF filter bandwidth. As an example, the full RF bandwidth can be 2%, 5%, 10%, etc. less than the IF filter bandwidth. The IF filtering can be designed to wider-than-RF-bandwidth to achieve a flatter RF bandwidth response while providing midband or crossover selectivity. The amount of midband or crossover selectivity from the IF filtering can allow an RF filter selectivity at the midband (or crossover) point to be reduced, which can provide an enhanced passband ripple performance of the RF filtering. In other words, a lower IF frequency can allow a filter/equalizer to achieve enhanced selectivity at the midband (or crossover) frequency.

Figure 8:
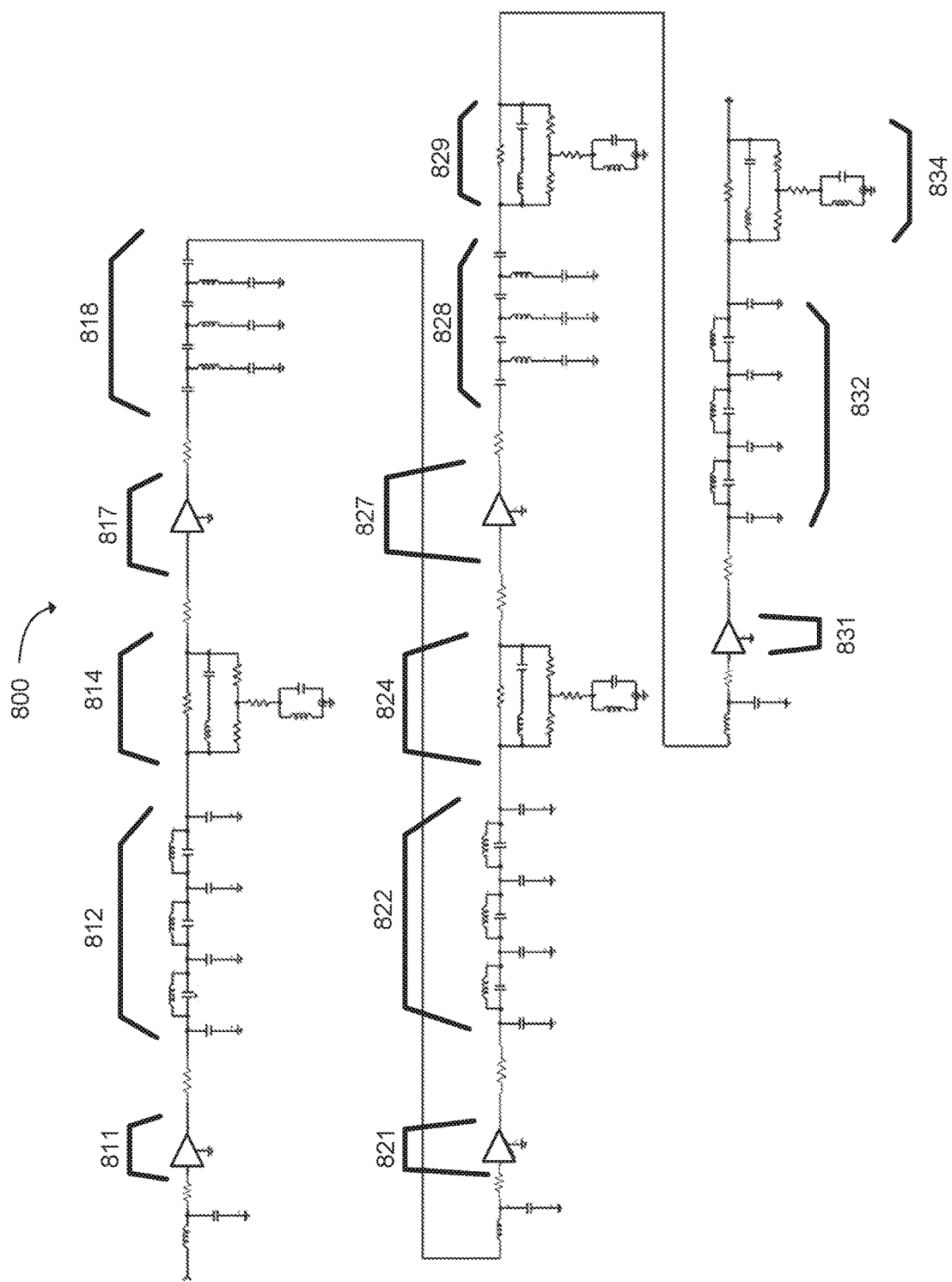
FIG. 8 illustrates a repeater architecture in accordance with an example.

FIG. 8 illustrates an example of a repeater architecture 800. The repeater architecture 800 can include an active IF path. In this example, a 75 dB IF gain can be achieved using a cascade of amplification (e.g., amplifiers 811, 817, 821, 827, 831), highpass (HP) filter (e.g., HP filters 818, 828), lowpass (LP) filter (e.g., LP filters 812, 822, 832) and equalizer stages (e.g., equalizers 814, 824, 829, 834). The repeater architecture can further comprise additional attenuators, inductors, capacitors, and amplifiers.

Figure 9:
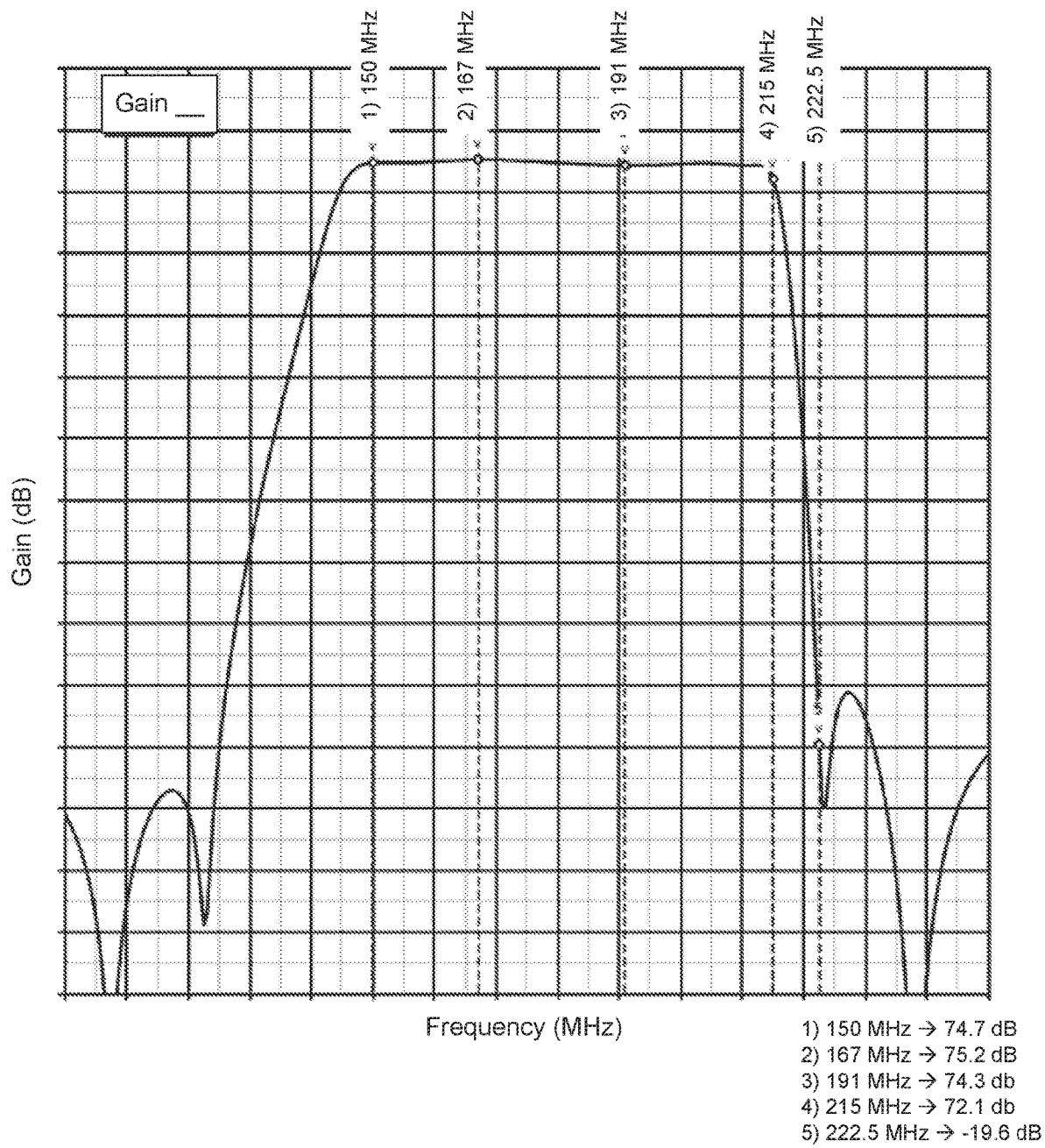
FIG. 9 illustrates an active intermediate frequency (IF) path response in accordance with an example.

FIG. 9 illustrates an example of an active intermediate frequency (IF) path response. In this example, a frequency of 150 MHz can correspond to a gain of 74.7 dB, a frequency of 167 MHz can correspond to a gain of 75.2 dB, a frequency of 191 MHz can correspond to a gain of 74.3 dB, a frequency of 215 MHz can correspond to a gain of 72.1 dB, and a frequency of 222.5 MHz can correspond to a gain of −19.6 dB. Furthermore, for a frequency (Fo) of 182.5 MHz, a 1 dB bandwidth (BW) can be equal to 66 MHz, a 2 dB BW can be equal to 68 MHz, and a 3 dB BW can be equal to 69.5 MHz.

In this example, the gain can be equal to approximately 75 dB with a passband ripple of approximately 1 dB. A band edge at 215 MHz can be 3 dB down from an in-band peak and 2.5 dB down from an average gain. An IF path response can be greater than 12 dB loss beyond a crossover frequency, with an approximately 20 dB mid-band loss at 222.5 MHz at 7.5 MHz above a high band edge. An IF loss at a midband frequency can reduce an RF midband selectivity requirement, thereby enabling less RF filter ripple. An approximately 20 dB loss can be at 25 MHz below a low band edge. In addition, another highpass or equalizer stage can be cascaded when RF filtering is short on mid-band selectivity.

Figure 10:
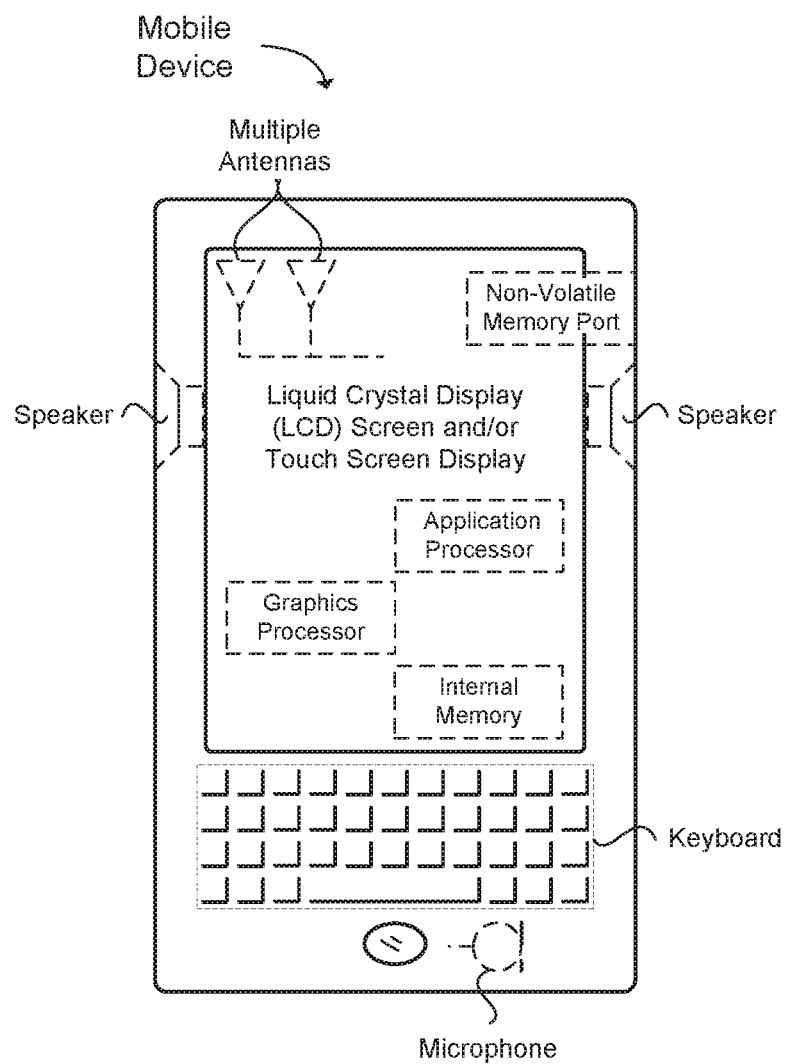
FIG. 10 illustrates a wireless device in accordance with an example.

FIG. 10 provides an example illustration of the wireless device, such as a user equipment (UE), a mobile station (MS), a mobile communication device, a tablet, a handset, a wireless transceiver coupled to a processor, or other type of wireless device. The wireless device can include one or more antennas configured to communicate with a node or transmission station, such as an access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can communicate using separate antennas for each wireless communication standard or shared antennas for multiple wireless communication standards. The wireless device can communicate in a wireless local area network (WLAN), a wireless personal area network (WPAN), and/or a WWVAN.

FIG. 10 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes a bi-directional frequency division duplex (FDD) repeater, comprising: a first antenna port; a second antenna port; and a signal path communicatively coupled between the first antenna port and the second antenna port, the signal path configured to carry a signal having a selected radio frequency (RF) bandwidth on an RF carrier at a selected frequency, wherein the signal path includes: a low noise amplifier (LNA) communicatively coupled to the first antenna port; a power amplifier (PA) communicatively coupled to the second antenna port; and an intermediate frequency (IF) filter block between the LNA and the PA, the IF filter block operable for down-conversion of the RF carrier to an IF carrier to enable the selected RF bandwidth of the signal to be bandpass filtered at an IF filter bandwidth having an IF passband frequency range and the IF passband frequency range of the IF filter bandwidth is greater than the selected RF bandwidth.

Example 2 includes the bi-directional FDD repeater of Example 1, wherein the down-conversion to the IF carrier provides increased crossover attenuation or midband isolation of the RF carrier for the bi-directional FDD repeater.

Example 3 includes the bi-directional FDD repeater of any of Examples 1 to 2, wherein the bi-directional FDD repeater is operable to use IF filtering in an RF system to achieve one or more of sharper RF filtering or a flatter RF bandwidth response while providing crossover or midband selectivity and preserving an entire RF bandwidth.

Example 4 includes the bi-directional FDD repeater of any of Examples 1 to 3, wherein an amount of crossover or midband selectivity from the IF filtering enables RF filter selectivity at a crossover or midband to be reduced, thereby enhancing a ripple performance of RF filtering at the bi-directional FDD repeater.

Example 5 includes the bi-directional FDD repeater of any of Examples 1 to 4, wherein the IF filter block is cascaded with an equalizer to correct an IF filter passband response over an entire RF bandwidth to achiever a flatter passband.

Example 6 includes the bi-directional FDD repeater of any of Examples 1 to 5, wherein IF filter attenuation at the crossover frequency or midband frequency reduces an RF crossover or midband selectivity requirement.

Example 7 includes the bi-directional FDD repeater of any of Examples 1 to 6, wherein a reduced IF frequency enables the equalizer to achieve enhanced selectivity at a crossover or midband frequency.

Example 8 includes the bi-directional FDD repeater of any of Examples 1 to 7, wherein the down-conversion to the IF signal reduces a minimum number of required RF passband filters in the signal path of the bi-directional FDD repeater.

Example 9 includes the bi-directional FDD repeater of any of Examples 1 to 8, wherein the IF filter block is operable for up-conversion of the IF carrier to the RF carrier.

Example 10 includes the bi-directional FDD repeater of any of Examples 1 to 9, wherein the IF filter block includes: a first mixer; a second mixer; a synthesizer communicatively coupled to the first mixer and the second mixer; and an IF bandpass filter communicatively coupled to the first mixer and the second mixer.

Example 11 includes the bi-directional FDD repeater of any of Examples 1 to 10, further comprising: a first RF bandpass filter communicatively coupled to the LNA; and a second RF bandpass filter communicatively coupled to the PA.

Example 12 includes the bi-directional FDD repeater of any of Examples 1 to 11, wherein: the first antenna port is communicatively coupled to a first antenna; and the second antenna port is communicatively coupled to a second antenna.

Example 13 includes the bi-directional FDD repeater of any of Examples 1 to 12, wherein the signal path is an uplink signal path or a downlink signal path.

Example 14 includes a repeater, comprising: a signal path configured to carry a signal having a selected radio frequency (RF) bandwidth on an RF carrier at a selected frequency, wherein the signal path includes: an intermediate frequency (IF) filter block operable for down-conversion of the RF carrier to an IF carrier to enable the selected RF bandwidth of the signal to be bandpass filtered at an IF filter bandwidth having an IF passband frequency range and the IF passband frequency range of the IF filter bandwidth is greater than the selected RF bandwidth.

Example 15 includes the repeater of Example 14, wherein the down-conversion to the IF carrier provides increased crossover attenuation or midband isolation of the RF carrier for the repeater.

Example 16 includes the repeater of any of Examples 14 to 15, further comprising: a first antenna port; and a second antenna port, wherein the signal path is communicatively coupled between the first antenna port and the second antenna port.

Example 17 includes the repeater of any of Examples 14 to 16, wherein the signal path further comprises: a low noise amplifier (LNA); and a power amplifier (PA), wherein the IF filter block is between the LNA and the PA.

Example 18 includes the repeater of any of Examples 14 to 17, wherein the repeater is operable to use IF filtering in an RF system to achieve sharper RF filtering and a flatter RF bandwidth response while providing crossover or midband selectivity and preserving an entire RF bandwidth.

Example 19 includes the repeater of any of Examples 14 to 18, wherein an amount of crossover or midband selectivity from the IF filtering enables RF filter selectivity at a crossover or midband to be reduced, thereby enhancing a ripple performance of RF filtering at the repeater.

Example 20 includes the repeater of any of Examples 14 to 19, wherein: the IF filter block is cascaded with an equalizer to correct an IF filter passband response over an entire RF bandwidth to achiever a flatter passband; and a reduced IF frequency enables the equalizer to achieve enhanced selectivity at a crossover or midband frequency.

Example 21 includes the repeater of any of Examples 14 to 20, wherein IF filter attenuation at the crossover frequency or midband frequency reduces an RF crossover or midband selectivity requirement.

Example 22 includes the repeater of any of Examples 14 to 21, wherein: the down-conversion to the IF signal reduces a minimum number of required RF passband filters in the signal path of the repeater; and the IF filter block is operable for up-conversion of the IF carrier to the RF carrier.

Example 23 includes the repeater of any of Examples 14 to 22, wherein the repeater is a bi-directional FDD repeater.

Example 24 includes a repeater, comprising: a signal path configured to carry a signal having a selected radio frequency (RF) bandwidth on an RF carrier at a selected frequency, wherein the signal path includes: a low noise amplifier (LNA) communicatively coupled to the first antenna port; a power amplifier (PA) communicatively coupled to the second antenna port; and an intermediate frequency (IF) filter block between the LNA and the PA, the IF filter block comprising: a first mixer; a second mixer; a synthesizer communicatively coupled to the first mixer and the second mixer; and an IF bandpass filter communicatively coupled to the first mixer and the second mixer, wherein the IF filter block is operable for down-conversion of the RF carrier to an IF carrier to enable the selected RF bandwidth of the signal to be bandpass filtered at an IF filter bandwidth having an IF passband frequency range and the IF passband frequency range of the IF filter bandwidth is greater than the selected RF bandwidth, wherein the down-conversion to the IF carrier provides increased crossover attenuation or midband isolation of the RF carrier for the repeater.

Example 25 includes the repeater of Example 24, wherein the repeater is operable to use IF filtering in an RF system to achieve one or more of sharper RF filtering or a flatter RF bandwidth response while providing crossover or midband selectivity and preserving an entire RF bandwidth.

Example 26 includes the repeater of any of Examples 24 to 25, wherein an amount of crossover or midband selectivity from the IF filtering enables RF filter selectivity at a crossover or midband to be reduced, thereby enhancing a ripple performance of RF filtering at the repeater.

Example 27 includes the repeater of any of Examples 24 to 26, wherein the IF filter block is cascaded with an equalizer to correct an IF filter passband response over an entire RF bandwidth to achiever a flatter passband, wherein a reduced IF frequency enables the equalizer to achieve enhanced selectivity at a crossover or midband frequency.

Example 28 includes the repeater of any of Examples 24 to 27, wherein: the down-conversion to the IF signal reduces a number of passband filters in the signal path of the repeater; and the IF filter block is operable for up-conversion of the IF carrier to the RF carrier.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A bi-directional frequency division duplex (FDD) repeater, comprising:
   a first antenna port;
   a second antenna port; and
   a signal path communicatively coupled between the first antenna port and the second antenna port, the signal path configured to carry a signal having a selected radio frequency (RF) bandwidth on an RF carrier at a selected frequency, wherein the signal path includes:
   a low noise amplifier (LNA) communicatively coupled to the first antenna port;
   a power amplifier (PA) communicatively coupled to the second antenna port; and
   an intermediate frequency (IF) filter block between the LNA and the PA, the IF filter block operable for down-conversion of the RF carrier to an IF carrier to enable the selected RF bandwidth of the signal to be bandpass filtered at an IF filter bandwidth having an IF passband frequency range and the IF passband frequency range of the IF filter bandwidth is greater than the selected RF bandwidth.

2. The bi-directional FDD repeater of claim 1, wherein the down-conversion to the IF carrier provides increased crossover attenuation or midband isolation of the RF carrier for the bi-directional FDD repeater.

3. The bi-directional FDD repeater of claim 1, wherein the bi-directional FDD repeater is operable to use IF filtering in an RF system to achieve one or more of sharper RF filtering or a flatter RF bandwidth response while providing crossover or midband selectivity and preserving an entire RF bandwidth.

4. The bi-directional FDD repeater of claim 3, wherein an amount of crossover or midband selectivity from the IF filtering enables RF filter selectivity at a crossover or midband to be reduced, thereby enhancing a ripple performance of RF filtering at the bi-directional FDD repeater.

5. The bi-directional FDD repeater of claim 1, wherein the IF filter block is cascaded with an equalizer to correct an IF filter passband response over an entire RF bandwidth to achiever a flatter passband.

6. The bi-directional FDD repeater of claim 5, wherein IF filter attenuation at the crossover frequency or midband frequency reduces an RF crossover or midband selectivity requirement.

7. The bi-directional FDD repeater of claim 5, wherein a reduced IF frequency enables the equalizer to achieve enhanced selectivity at a crossover or midband frequency.

8. The bi-directional FDD repeater of claim 1, wherein the down-conversion to the IF signal reduces a minimum number of required RF passband filters in the signal path of the bi-directional FDD repeater.

9. The bi-directional FDD repeater of claim 1, wherein the IF filter block is operable for up-conversion of the IF carrier to the RF carrier.

10. The bi-directional FDD repeater of claim 1, wherein the IF filter block includes:
    a first mixer;
    a second mixer;
    a synthesizer communicatively coupled to the first mixer and the second mixer; and
    an IF bandpass filter communicatively coupled to the first mixer and the second mixer.

11. The bi-directional FDD repeater of claim 1, further comprising:
    a first RF bandpass filter communicatively coupled to the LNA; and
    a second RF bandpass filter communicatively coupled to the PA.

12. The bi-directional FDD repeater of claim 1, wherein:
    the first antenna port is communicatively coupled to a first antenna; and
    the second antenna port is communicatively coupled to a second antenna.

13. The bi-directional FDD repeater of claim 1, wherein the signal path is an uplink signal path or a downlink signal path.

14. A repeater, comprising:
    a signal path configured to carry a signal having a selected radio frequency (RF) bandwidth on an RF carrier at a selected frequency, wherein the signal path includes:
    an intermediate frequency (IF) filter block operable for down-conversion of the RF carrier to an IF carrier to enable the selected RF bandwidth of the signal to be bandpass filtered at an IF filter bandwidth having an IF passband frequency range and the IF passband frequency range of the IF filter bandwidth is greater than the selected RF bandwidth.

15. The repeater of claim 14, wherein the down-conversion to the IF carrier provides increased crossover attenuation or midband isolation of the RF carrier for the repeater.

16. The repeater of claim 14, further comprising:
    a first antenna port; and
    a second antenna port,
    wherein the signal path is communicatively coupled between the first antenna port and the second antenna port.

17. The repeater of claim 14, wherein the signal path further comprises:
    a low noise amplifier (LNA); and
    a power amplifier (PA),
    wherein the IF filter block is between the LNA and the PA.

18. The repeater of claim 14, wherein the repeater is operable to use IF filtering in an RF system to achieve sharper RF filtering and a flatter RF bandwidth response while providing crossover or midband selectivity and preserving an entire RF bandwidth.

19. The repeater of claim 18, wherein an amount of crossover or midband selectivity from the IF filtering enables RF filter selectivity at a crossover or midband to be reduced, thereby enhancing a ripple performance of RF filtering at the repeater.

20. The repeater of claim 14, wherein:
    the IF filter block is cascaded with an equalizer to correct an IF filter passband response over an entire RF bandwidth to achiever a flatter passband; and
    a reduced IF frequency enables the equalizer to achieve enhanced selectivity at a crossover or midband frequency.

21. The repeater of claim 20, wherein IF filter attenuation at the crossover frequency or midband frequency reduces an RF crossover or midband selectivity requirement.

22. The repeater of claim 14, wherein:
    the down-conversion to the IF signal reduces a minimum number of required RF passband filters in the signal path of the repeater; and
    the IF filter block is operable for up-conversion of the IF carrier to the RF carrier.

23. The repeater of claim 14, wherein the repeater is a bi-directional FDD repeater.

24. A repeater, comprising:

a signal path configured to carry a signal having a selected radio frequency (RF) bandwidth on an RF carrier at a selected frequency, wherein the signal path includes:

a low noise amplifier (LNA) communicatively coupled to the first antenna port;

a power amplifier (PA) communicatively coupled to the second antenna port; and an intermediate frequency (IF) filter block between the LNA and the PA, the IF filter block comprising:

a first mixer;

a second mixer;

a synthesizer communicatively coupled to the first mixer and the second mixer; and an IF bandpass filter communicatively coupled to the first mixer and the second mixer, wherein the IF filter block is operable for down-conversion of the RF carrier to an IF carrier to enable the selected RF bandwidth of the signal to be bandpass filtered at an IF filter bandwidth having an IF passband frequency range and the IF passband frequency range of the IF filter bandwidth is greater than the selected RF bandwidth, wherein the down-conversion to the IF carrier provides increased crossover attenuation or midband isolation of the RF carrier for the repeater.

25. The repeater of claim 24, wherein the repeater is operable to use IF filtering in an RF system to achieve one or more of sharper RF filtering or a flatter RF bandwidth response while providing crossover or midband selectivity and preserving an entire RF bandwidth.

26. The repeater of claim 25, wherein an amount of crossover or midband selectivity from the IF filtering enables RF filter selectivity at a crossover or midband to be reduced, thereby enhancing a ripple performance of RF filtering at the repeater.

27. The repeater of claim 24, wherein the IF filter block is cascaded with an equalizer to correct an IF filter passband response over an entire RF bandwidth to achiever a flatter passband, wherein a reduced IF frequency enables the equalizer to achieve enhanced selectivity at a crossover or midband frequency.

28. The repeater of claim 24, wherein:

the down-conversion to the IF signal reduces a number of passband filters in the signal path of the repeater; and the IF filter block is operable for up-conversion of the IF carrier to the RF carrier.

* * * * *